(12) United States Patent
Zhao et al.

(10) Patent No.: US 11,959,012 B1
(45) Date of Patent: Apr. 16, 2024

(54) TEMPERATURE-RESISTANT AND SALT-RESISTANT MODIFIED NANO-GRAPHITE DISPERSED PARTICLE GEL SYSTEM WITH STRONG SELF-GROWTH EFFECT

(71) Applicants: China University of Petroleum (East China), Qingdao (CN); CNOOC Energy Development Co., Ltd. Engineering Branch, Tianjin (CN); Tianjin Branch of China National Offshore Oil Corporation Ltd., Tianjin (CN)

(72) Inventors: Guang Zhao, Qingdao (CN); Caili Dai, Qingdao (CN); Dongfang Lyu, Qingdao (CN); Jiaming Li, Qingdao (CN); Kequan Meng, Tianjin (CN); Ju Zheng, Tianjin (CN); Yanxu Zhang, Tianjin (CN); Weiyu Chen, Tianjin (CN); Liguo Zhu, Tianjin (CN); Yanhui Zhang, Tianjin (CN)

(73) Assignees: China University of Petroleum (East China), Qindao (CN); CNOOC Energy Development Co., Ltd. Engineering Branch, Tianjin (CN); Tianjin Branch of China National Offshore Oil Corporation Ltd., Tianjin (CN)

( * ) Notice: Subject to any disclaimer, the term of this patent is extended or adjusted under 35 U.S.C. 154(b) by 0 days.

(21) Appl. No.: 18/467,663

(22) Filed: Sep. 14, 2023

(30) Foreign Application Priority Data

Sep. 14, 2022 (CN) .......................... 202211117477.9

(51) Int. Cl.
*C09K 8/42* (2006.01)
(52) U.S. Cl.
CPC .................................. *C09K 8/426* (2013.01)
(58) Field of Classification Search
CPC ...................................................... C09K 8/426
See application file for complete search history.

(56) References Cited

U.S. PATENT DOCUMENTS 10,759,987 B1 * 9/2020 Zhao .................... C09K 8/5045

FOREIGN PATENT DOCUMENTS

| CN | 107502325 A | 12/2017 |
|---|---|---|
| CN | 107556990 A | 1/2018 |
| CN | 108300440 A | 7/2018 |
| CN | 108706580 A | 10/2018 |
| CN | 111040750 A | 4/2020 |
| CN | 113637183 A | 11/2021 |
| CN | 113897189 A | 1/2022 |

* cited by examiner

*Primary Examiner* — Crystal J Lee
(74) *Attorney, Agent, or Firm* — Calfee, Halter & Griswold LLP (57) ABSTRACT

The present disclosure a temperature-resistant and salt-resistant modified nano-graphite dispersed particle gel system with a strong self-growth effect.

9 Claims, 2 Drawing Sheets

TEMPERATURE-RESISTANT AND SALT-RESISTANT MODIFIED NANO-GRAPHITE DISPERSED PARTICLE GEL SYSTEM WITH STRONG SELF-GROWTH EFFECT

CROSS-REFERENCE TO RELATED APPLICATIONS

The application claims the benefit of Chinese Application No. 202211117477.9, filed on Sep. 14, 2022, entitled "Temperature-resistant and Salt-resistant Modified Nano-Graphite Dispersed Particle Gel System with Strong Self-Growth Effect and Dispersed Particle Gel and Preparation Method and Use Thereof", the contents of which is specifically and entirely incorporated herein by reference.

FIELD

The present disclosure belongs to the technical field of oilfield chemistry and particularly relates to a temperature-resistant and salt-resistant modified nano-graphite dispersed particle gel system with a strong self-growth effect, a dispersed particle gel, and a preparation method and a use thereof.

BACKGROUND

The high-temperature and high-salinity oil reservoirs are widely distributed in China, and mainly distributed in Tahe oilfield, Tarim oilfield, Shengli oil fields, and the like. Waterflooding is the main mode for exploiting the high-temperature and high-salinity oil reservoirs, but the heterogeneity of the stratum is aggravated by long-term waterflooding development, such that the water channeling is caused, the sweep efficiency is low, and the recovery percent is poor. Profile control and water shutoff are means for improving the heterogeneity of the high-temperature and high-salinity oil reservoirs, and a high-temperature and high-salinity resistant plugging agent is the core. The gel-type plugging agent is an important plugging agent for improving heterogeneity of the oil reservoir, it is successfully used in the high-temperature and high-salinity oil reservoirs. However, the existing gel system is composed of polymer, a cross-linking agent, and a cross-linking auxiliary agent, and a gel-forming solution is prepared on the ground, then the gel-forming solution is injected underground and waited on a cement setting to obtain a viscoelastic gel system, such that the heterogeneity of the oil reservoir is regulated and controlled. During the use process of the gel, the gel-forming solution is easily influenced by the ground pipe flow shearing, underground dilution, porous medium shearing, as well as the high-temperature and hypersalinity environment, so that the underground gel-forming process is uncontrollable, thereby affecting the long-term effectiveness of regulating and controlling the heterogeneity of the gel reservoir.

CN113897189A discloses a gel system suitable for profile control of a high-temperature and high-salinity fracture-vug type oil reservoir and use of the gel system, wherein the system consists of an AM/AMPS copolymer, nonionic polyacrylamide, urotropine, hydroquinone and water, the gelatinizing time is within the range of 1.5-5.5 hours, the gel system can resist the temperature of 130° C. and the high salinity of 220,000 mg/L, and exhibit the desirable stability and high strength. However, the system has too short gelatinizing time, and is prone to carry out the cross-linking reaction during the process of flowing in the wellhole, thereby causing large risk control measures. CN107502325A discloses a preparation method and use of a high-temperature and high-salt resistant profile control and flooding agent, wherein the high-temperature and high-salt resistant profile control and flooding agent is consisting of a temperature tolerance and salt resistant polymer, a cross-linking agent, a stabilizer and water, and can be completely gelled within 8-24 hours, can resist the temperature of 120° C. and the high mineralization degree of 150,000 mg/L, but it is difficult to be applied in the oil reservoirs with the high temperature of 130° C. and the high mineralization degree of more than 200,000 mg/L.

In order to implement the regulation and control of heterogeneity of the deep and ultra-deep oil reservoirs with a higher temperature (up to 180° C.) and a higher mineralization degree (up to 300,000 mg/L), the present disclosure aims to convert the traditional gel from "the underground gel-forming" into "the ground gel-forming", enhance the temperature resistance and salt resistance of the body gel system by using the modified nano-graphite and preparing a fast cross-linked bulk gel system on the ground, and shear the bulk gel system by means of the high-speed mechanical shearing action to form the dispersed particle gel (DPG) with different particle sizes, to induce and strengthen the self-growth effect between the self characteristics of DPGs and particles to form a DPG agglomerate with a strong adhesion effect, such that the effective regulation and control of the heterogeneous reservoir is realized.

SUMMARY

The present disclosure aims to solve the defects in the existing art with respect to the uncontrollable underground gel formation process of the existing gel system, the gel system is prone to lose efficiency under the high-temperature and high-salinity environment, and regulation and control of the oil reservoirs are impracticable, and provides a temperature-resistant and salt-resistant modified nano-graphite DPG system with a strong self-growth effect, a DPG and a preparation method and a use thereof, forms an agglomerate with a strong adhesion effect through the self-growth effect of the DPG particles, in order to implement an efficient regulation and control on the oil reservoirs, thereby realizing the effective regulation and control on heterogeneity of the oil reservoirs.

In order to achieve the above objects, the first aspect of the present disclosure provides a temperature-resistant and salt-resistant modified nano-graphite DPG system with a strong self-growth effect comprising a temperature-resistant and salt-resistant functional polymer, a cross-linking agent, a chelating agent, and a modified nano-graphite inducer; wherein the modified nano-graphite inducer comprises nano-graphite oxide particles and monofunctional polyether amine covalently grafted on the surfaces of the nano-graphite oxide particles through amido bonds, and the structural formula of the monofunctional polyether amine is as shown in formula (I);

wherein $R_1$ is one selected from $C_1$-$C_5$ alkyl groups; $R_2$ is H or one of $C_1$-$C_5$ alkyl groups; and n is an integer from 10 to 60.

The second aspect of the present disclosure provides a method for preparing a temperature-resistant and salt-resistant modified nano-graphite DPG with a strong self-growth effect comprising:

(I) providing a gel-forming solution containing a dispersion system and water, then aging and gelling the gel-forming solution to obtain a bulk gel; wherein the dispersion system is the aforementioned temperature-resistant and salt-resistant modified nano-graphite DPG system with a strong self-growth effect;

(II) subjecting the bulk gel and water to a shearing treatment to obtain the DPG.

The third aspect of the present disclosure provides a DPG prepared with the aforementioned method.

The fourth aspect of the present disclosure provides a use of the aforementioned DPG in the regulation and control of the oil reservoir.

Due to the technical scheme, the modified nano-graphite inducer of the present disclosure is used for enhancing the temperature resistance and salt resistance of the bulk gel, and shear the bulk gel system by means of the high-speed mechanical shearing action to form the gel dispersion with different particle sizes, so as to induce and strengthen the self-growth effect between the self characteristics of a gel dispersion and particles to form an agglomerate with a strong adhesion effect, such that the effective regulation and control of the heterogeneous reservoir is realized.

The DPG of the present disclosure has the following advantages:

(1) The temperature-resistant and salt-resistant modified nano-graphite DPG with a strong self-growing effect provided by the present disclosure can resist the high temperature of 180° C. and the high salinity of 300,000 mg/L and can regulate and control heterogeneity of the ultra-high temperature and ultra-high salinity oil reservoirs.

(2) The temperature-resistant and salt-resistant modified nano-graphite DPG with a strong self-growing effect provided by the present disclosure strengthens the self-growth capability of the DPG and the strength of a self-grown agglomerate by utilizing the induced agglomeration action of a modified nano-graphite inducer in a high-temperature and high-salt environment, and the self-growth multiple may reach 200 times.

(3) In the temperature-resistant and salt-resistant modified nano-graphite DPG with a strong self-growing effect provided by the present disclosure, the modified nano-graphite inducer has desirable water-based dispersibility, and participates in the formation of a DPG skeleton through physical actions such as hydrogen bonds and Van der Waals force, so that the temperature-resistant and salt-resistant performance of the DPG is greatly improved.

(4) The temperature-resistant and salt-resistant modified nano-graphite DPG with a strong self-growing effect provided by the present disclosure has the advantages of wide raw material sources, simple preparation process, and stable product properties.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

The deep stratum oil and gas reservoir refers to an oil and gas reservoir with a burial depth of 3,500-4,500 m.

The ultra-deep stratum oil and gas reservoir refers to an oil and gas reservoir with a burial depth of more than 4,500 m (e.g., 6,000-9,000 m).

The high-temperature and high-salinity condition refers to the conditions that the temperature is more than or equal to 150° C., and the mineralization degree is more than or equal to $10 \times 10^4$ mg/L.

In the first aspect, the present disclosure provides a temperature-resistant and salt-resistant modified nano-graphite DPG system with a strong self-growth effect comprising a temperature-resistant and salt-resistant functional polymer, a cross-linking agent, a chelating agent, and a modified nano-graphite inducer; the modified nano-graphite inducer comprises nano-graphite oxide particles and monofunctional polyether amine covalently grafted on the surfaces of the nano-graphite oxide particles through amido bonds, and the structural formula of the monofunctional polyether amine is as shown in formula (I);

wherein $R_1$ is one selected from $C_1$-$C_5$ alkyl groups; $R_2$ is H or one of $C_1$-$C_5$ alkyl groups; and n is an integer of 10 to 60.

The modified nano-graphite inducer of the present disclosure can be used for enhancing the temperature resistance and salt resistance of the bulk gel, the modified nano-graphite inducer is used for inducing and strengthening the self-growth effect between the self characteristics of a DPG and particles to form an agglomerate with a strong adhesion effect, thereby implementing the effective regulation and control of the heterogeneous reservoirs.

According to a preferred embodiment of the present disclosure, $R_1$ may be at least one selected from the group consisting of methyl, ethyl, propyl, and butyl, preferably $R_1$ is $CH_3$.

According to a preferred embodiment of the present disclosure, $R_2$ may be at least one selected from the group consisting of hydrogen, methyl, ethyl, propyl, and butyl, preferably $R_2$ is H and/or $CH_3$.

According to a preferred embodiment of the present disclosure, n is one of 12, 20, 40 and 60.

The average lamella size of the modified nano-graphite inducer in the present disclosure can be selected from a wide range, and according to a preferred embodiment of the present disclosure, the modified nano-graphite inducer has an average lamella size within the range of 150-600 nm, preferably within the range of 200-500 nm.

The average lamella thickness of the modified nano-graphite inducer in the present disclosure can be selected from a wide range, and according to a preferred embodiment of the present disclosure, the modified nano-graphite inducer has an average lamella thickness within the range of 1-100 nm, preferably within the range of 1-20 nm.

In the present disclosure, the grafting ratio of the monofunctional polyether amine may be selected from a wide range, and according to a preferred embodiment of the present disclosure, the monofunctional polyether amine has a grafting ratio within the range of 15-40 wt %, based on the total weight of the modified nano-graphite inducer.

According to a preferred embodiment of the present disclosure, the modified nano-graphite inducer has at least one of the structures shown in formulas (II), (III), (IV), and (V);

(II)

(III)

-continued (IV)

(V)

According to a preferred embodiment of the present disclosure, in formulas (II), (III), (IV), (V), R is each independently H and/or CH$_3$; n is each independently 12, 20, 40, or 60.

According to a preferred embodiment of the present disclosure, the modified nano-graphite inducer has a structure shown in formula (II).

The object of the present disclosure can be achieved, as long as the modified nano-graphite inducer of the present disclosure has the aforementioned characteristics, and there is no particular requirement for the method of preparing the modified nano-graphite inducer, the present disclosure provides a method for preparing the modified nano-graphite inducer comprising:

(1) dispersing a nano-graphite oxide particles in a solvent to obtain a dispersion liquid of nano-graphite oxide particles;

(2) mixing the dispersion liquid of nano-graphite oxide particles with material I, material II, and monofunctional polyether amine in an inert gas atmosphere, and carrying out a contact reaction to obtain a mixed reaction solution;

(3) filtering, washing, and drying the mixed reaction solution to obtain a modified nano-graphite inducer;

wherein the material I in step (2) is selected from 1-ethyl-(3-dimethyl aminopropyl) carbodiimide hydrochloride and/or dicyclohexylcarbodiimide (DCCI);

the material II is selected from 1-hydroxy benzotriazole and/or N-hydroxysuccinimide. The present disclosure uses material I and material II as catalysts and the monofunctional polyether amine covalently grafted on the surfaces of the nano-graphite oxide particles through amido bonds.

According to a preferred embodiment of the present disclosure, the method for preparing the modified nano-graphite inducer comprising:

(1) dispersing a nano-graphite oxide particles into a solvent under the temperature condition of 20-30° C. to obtain a dispersion liquid of nano-graphite oxide particles;

(2) adding a material I and a material II into the dispersion liquid of nano-graphite oxide particles in step (1) under the temperature condition of 20-30° C. and in an inert gas atmosphere to obtain a dispersion liquid of active nano-graphite oxide particles;

(3) adding monofunctional polyethylene amine into the dispersion liquid of active nano-graphite oxide particles in step (2) under the inert gas atmosphere condition, and carrying out a contact reaction to obtain a mixed reaction solution;

(4) filtering, washing and drying the mixed reaction solution to obtain a modified nano-graphite inducer.

According to a preferred embodiment of the present disclosure, the material I is 1-ethyl-(3-dimethylaminopropyl) carbodiimide hydrochloride.

According to a preferred embodiment of the present disclosure, the material II is N-hydroxysuccinimide.

According to a preferred embodiment of the present disclosure, the dosage ratio of the nano-graphite oxide particles to the monofunctional polyether amine is (0.1-1.0%):(0.5-2.0%). In the present invention, it should be noted that the dosage ratio is the quality dosage ratio; In addition, (0.1-1.0%):(0.5-2.0%) is equivalent to (0.1-1.0):(0.5-2.0).

According to a preferred embodiment of the present disclosure, the dosage ratio of the nano-graphite oxide particles to the material I is (0.1-1.0%):(0.1-0.5%); In addition, (0.1-1.0%):(0.1-0.5%), i.e. (0.1-1.0):(0.1-0.5).

According to a preferred embodiment of the present disclosure, the dosage ratio of the nano-graphite oxide particles to the material II is (0.1-1.0%):(0.1-0.5%); In addition, (0.1-1.0%):(0.1-0.5%), i.e. (0.1-1.0):(0.1-0.5).

In the present disclosure, the contact reaction conditions in step (4) may be selected from a wide range, and the reaction time can be reasonably adjusted according to the reaction temperature, and according to a preferred embodiment of the present disclosure, the contact reaction conditions comprise: the reaction temperature is within the range of 50-60° C., and preferably within the range of 52-58° C.; the reaction time is within the range of 24-48 h, preferably within the range of 30-42 h.

In step (4) of the present disclosure, the monofunctional polyether amine is added to the dispersion liquid of active nano-graphite oxide particles in step (2) for carrying out the condensation backflow contact reaction.

In the present disclosure, the nano-graphite oxide particles are dispersed in the solvent by using a existing dispersion mode in the field, such as stirring and ultrasonic dispersion; according to a preferred embodiment of the present disclosure, ultrasonic dispersion is adopted; preferably, the ultrasonic power is 260-390 W, more preferably 300-350 W; the ultrasonic dispersion time is 20-30 min, and preferably 25 min.

In the present disclosure, 1-ethyl-(3-dimethyl aminopropyl) carbodiimide hydrochloride and N-hydroxysuccinimide are dispersed in the dispersion liquid of nano-graphite oxide particles by using a existing dispersion method in the art, for example, stirring, ultrasonic dispersion.

The filtering, washing, and drying means and conditions are not particularly limited in the present disclosure, each may be the existing filtering, washing, and drying means and conditions in the art, for example, the filtering is performed by using a polytetrafluoroethylene membrane having a pore diameter of 0.1-0.45 μm, such as a polytetrafluoroethylene membrane having a pore diameter of 0.22 μm; for example, the washing solvent may be anhydrous methanol and/or anhydrous ethanol; the washing cycles are 2-5 times, preferably 3-4 times; the drying mode is freeze drying or vacuum drying; the drying time is 24-96 hours, preferably 48-72 hours.

The inert gas is not particularly limited in the present disclosure, it may be one or more selected from the group consisting of nitrogen gas, helium gas, and argon gas, preferably the nitrogen gas.

In the present disclosure, the ratio of the nano-graphite oxide particles to the solvent may be selected from a wide range, and according to a preferred embodiment of the present disclosure, the ratio of the nano-graphite oxide particles to the solvent is 1: 100-1,000.

According to a preferred embodiment of the present disclosure, the nano-graphite oxide particles have an average lamella size within the range of 50-500 nm, preferably within the range of 100-300 nm.

According to a preferred embodiment of the present disclosure, the nano-graphite oxide particles have an average lamella thickness within the range of 1-100 nm, preferably within the range of 1-20 nm.

According to a preferred embodiment of the present disclosure, the monofunctional polyether amine has a number average molecular weight within the range of 600 g/mol-3,000 g/mol.

The solvent is not particularly limited in the present disclosure, and according to a preferred embodiment of the present disclosure, the solvent is at least one of water, methanol, and ethanol.

According to a preferred embodiment of the present disclosure, the content of the cross-linking agent is 60-300 parts by weight, the content of the chelating agent is 100-750 parts by weight, and the content of the modified nano-graphite inducer is 2-20 parts by weight; based on 100 parts by weight of the temperature-resistant and salt-resistant functional polymer.

In the present disclosure, the temperature-resistant and salt-resistant functional polymer can be selected from a wide variety, each of the temperature-resistant and salt-resistant polymer in the art can be used in the present disclosure, and according to a preferred embodiment of the present disclosure, the temperature-resistant and salt-resistant functional polymer is selected from a binary copolymer of acrylamide and 2-acrylamide-2-methyl propane sulfonic acid, and more preferably, the mass ratio of the acrylamide structural unit to the 2-acrylamide-2-methyl propane sulfonic acid structural unit is (4-6):(6-4).

The cross-linking agent in the present disclosure may be selected from the wide types, as long as it is cross-linked with the temperature-resistant and salt-resistant polymer of the present disclosure to form the bulk gel. According to a preferred embodiment of the present disclosure, the cross-linking agent is an aldehyde cross-linking agent and/or a phenolic cross-linking agent, and more preferably, the aldehyde cross-linking agent is hexamethylenetetramine and/or formaldehyde; the phenolic cross-linking agent is at least one of catechol, resorcinol, and hydroquinone.

In the present disclosure, a variety of chelating agents can be selected from a wide range, as long as the chelating agent can generate chelation with metal ions. According to a preferred embodiment of the present disclosure, the chelating agent is disodium ethylene diamine tetraacetate and/or tetrasodium ethylene diamine tetraacetate.

The water is not particularly limited in the present disclosure, and the water is clear water or treated oil field reinjection sewage.

According to a preferred embodiment of the present disclosure, the binary copolymer has a relative molecular mass within the range of $4.0 \times 10^6$ g/mol-$8.0 \times 10^6$ g/mol.

According to a preferred embodiment of the present disclosure, the binary copolymer has a hydrolysis degree within the range of 2-6%.

According to a preferred embodiment of the present disclosure, the cross-linking agent is a combination of an aldehyde cross-linking agent and a phenolic cross-linking agent, and the mass ratio of the aldehyde cross-linking agent to the phenolic cross-linking agent is (0.5-2): 1.

In the second aspect, the present disclosure provides a method for preparing a temperature-resistant and salt-resistant modified nano-graphite DPG with a strong self-growth effect comprising:

(I) providing a gel-forming solution containing a dispersion system and water, then aging and gelling the gel-forming solution to obtain a bulk gel; wherein the dispersion system is the aforementioned temperature-resistant and salt-resistant modified nano-graphite DPG system with a strong self-growth effect;

(II) subjecting the bulk gel and water to a shearing treatment to obtain the DPG.

According to a preferred embodiment of the present disclosure, the mass content of the temperature-resistant and salt-resistant functional polymer in the gel-forming solution in step (I) is within the range of 0.4-1.0 wt %; the mass content of water is within the range of 94.6-97.95 wt %.

According to a preferred embodiment of the present disclosure, the aging conditions in step (I) comprise a temperature within the range of 90-100° C. and a time within the range of 6-24 hours.

According to a preferred embodiment of the present disclosure, the mass ratio of the bulk gel to water in step (II) is (1-9): 1; preferably, the shearing treatment is performed in a colloid mill for a shearing time of 30-60 min.

The aging conditions are not particularly limited in the present disclosure, as long as the gel-forming solution can form a jelly, the aging conditions comprise: the temperature is within the range of 90-100° C., the aging time can be reasonably adjusted according to the practical requirements, and preferably, the aging time is 6-24 hours.

According to a preferred embodiment of the present disclosure, the method for preparing the bulk gel comprising:

(1) adding a chelating agent into the water according to the proportion under the temperature condition of 20-30° C. while stirring, until all the chelating agent is dissolved into a clear and transparent solution;

(2) introducing a modified nano-graphite inducer into the solution obtained in step (1) according to the proportion under the temperature condition of 20-30° C. while stirring, then stirring or ultrasonically dispersing to obtain a uniformly dispersed solution;

(3) adding a temperature-resistant and salt-resistant functional polymer into the dispersion solution obtained in step (2) according to the proportion under the temperature condition of 20-30° C., and continuously stirring for 1.5-2 hours to obtain a uniform dispersion solution;

(4) introducing a cross-linking agent into the dispersion solution obtained in step (3) according to the proportion under the temperature condition of 20-30° C., and continuously stirring for 20-30 min to obtain a gel-forming solution;

(5) aging the gel-forming solution obtained in step (4) at the temperature range of 90-100° C. for 6-24 hours to obtain the bulk gel.

In the third aspect, the present disclosure provides a DPG prepared with the aforementioned method.

The temperature-resistant and salt-resistant modified nano-graphite DPG with a strong self-growing effect provided by the present disclosure can resist the high temperature of 180° C. and the high salinity of 300,000 mg/L and can regulate and control heterogeneity of the ultra-high temperature and ultra-high salinity oil reservoirs.

The temperature-resistant and salt-resistant modified nano-graphite DPG with a strong self-growing effect provided by the present disclosure strengthens the self-growth capability of the DPG and the strength of a self-grown agglomerate by utilizing the induced agglomeration action of a modified nano-graphite inducer in a high-temperature and high-salt environment, and the self-growth multiple may reach 200 times.

In the temperature-resistant and salt-resistant modified nano-graphite DPG with a strong self-growing effect provided by the present disclosure, the modified nano-graphite inducer has desirable water-based dispersibility, and participates in the formation of a DPG skeleton through physical actions such as hydrogen bonds and Van der Waals force, so that the temperature-resistant and salt-resistant performance of the DPG is greatly improved.

The temperature-resistant and salt-resistant modified nano-graphite DPG with a strong self-growing effect provided by the present disclosure has the advantages of wide raw material sources, simple preparation process, and stable product properties.

In the fourth aspect, the present disclosure provides a use of the aforementioned DPG in the regulation and control of the oil reservoir. Preferably the use of the DPG in the regulation and control of the deep or ultra-deep oil reservoirs. An agglomerate with a strong adhesion effect is formed by means of the self-growth effect of the DPG particles, thereby forming an effective regulation and control on the reservoir stratum, so that the effective regulation and control of the heterogeneous reservoir stratum is realized.

The present disclosure will be described in detail below with reference to examples.

In the following examples, all the temperature-resistant and salt-resistant functional polymers, the phenolic cross-linking agent, the aldehyde cross-linking agents, and the chemical agents were commercially available.

In the following examples, the temperature-resistant and salt-resistant functional polymer was a binary copolymer of acrylamide and 2-acrylamide-2-methyl propanesulfonic acid.

In the modified nano-graphite inducer, each of the nano-graphite oxide, the monofunctional polyether amine (with a number average molecular weight 600 g/mol, 1,000 g/mol, 2,000 g/mol, 3,000 g/mol), 1-ethyl-(3-dimethylaminopropyl) carbodiimide hydrochloride (EDC-HCl) and N-hydroxysuccinimide (NHS) was commercially available.

Example 1

(1) 0.3 g of nano-graphite oxide with an average lamella size of 183 nm and an average lamella thickness of 1.7 nm was ultrasonically dispersed in 100 mL of deionized water at the temperature condition of 25° C. for 25 min to obtain a uniform nano-graphite oxide dispersion liquid;

(2) Nitrogen gas was continuously introduced into the nano-graphite oxide dispersion liquid obtained in step (1) at the temperature condition of 25° C., 0.3 g of 1-ethyl-(3-dimethyl aminopropyl) carbodiimide hydrochloride was added, and stirred for 15 min, 0.3 g of N-hydroxysuccinimide was further added, and stirred for 15 min to obtain an active nano-graphite oxide dispersion liquid;

(3) 0.6 g of monofunctional polyether amine (with a number average molecular weight of 1,000 g/mol) was added into the active nano-graphite oxide dispersion liquid in step (2), the temperature was raised to 55° C., the condensation backflow reaction was performed in nitrogen gas for 30 hours to obtain a mixed reaction liquid;

(4) the mixed reaction solution obtained in step (3) was filtered by using a polytetrafluoroethylene membrane having a pore diameter of 0.22 μm, the filtered product was then washed with absolute ethyl alcohol 3 times, then subjected to freeze-drying for 48 hours to obtain a modified nano-graphite inducer.

The modified nano-graphite inducer had an average lamella size of 264 nm and an average lamella thickness of 3.6 nm, and exhibited a structure shown in formula (II), wherein n=20, and R was H; the grafting ratio of the monofunctional polyether amine was 31 wt %, based on the total weight of the modified nano-graphite particles.

Figure 1:
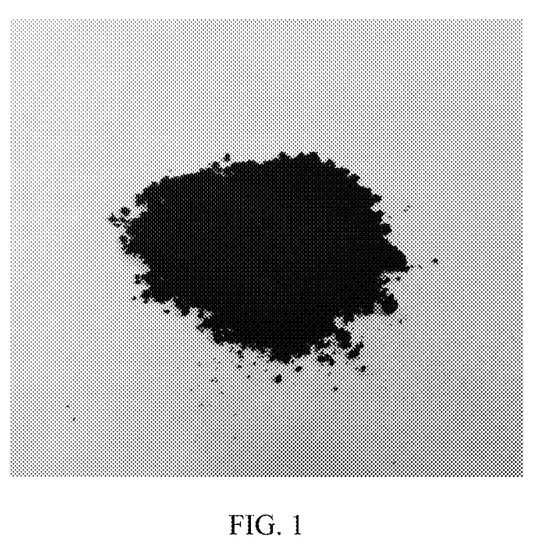
FIG. 1 illustrates a macroscopic view of the modified nano-graphite inducer prepared in Example 1 of the present disclosure.

The macroscopic state distribution view of the modified nano-graphite inducer was shown in FIG. 1.

Example 2

(1) 0.5 g of nano-graphite oxide with an average lamella size of 252 nm and an average lamella thickness of 1.1 nm was ultrasonically dispersed in 100 mL of deionized water at the temperature condition of 25° C. for 25 min to obtain a uniform nano-graphite oxide dispersion liquid;
(2) Nitrogen gas was continuously introduced into the nano-graphite oxide dispersion liquid obtained in step (1) at the temperature condition of 25° C., 0.5 g of 1-ethyl-(3-dimethyl aminopropyl) carbodiimide hydrochloride was added, and stirred for 15 min, 0.5 g of N-hydroxysuccinimide was further added, and stirred for 15 min to obtain an active nano-graphite oxide dispersion liquid;
(3) 1.0 g of monofunctional polyether amine (with a number average molecular weight of 2,000 g/mol) was added into the active nano-graphite oxide dispersion liquid in step (2), the temperature was raised to 58° C., the condensation backflow reaction was performed in nitrogen gas for 36 hours to obtain a mixed reaction liquid;
(4) The mixed reaction solution obtained in step (3) was filtered by using a polytetrafluoroethylene membrane having a pore diameter of 0.22 μm, the filtered product was then washed with absolute ethyl alcohol 3 times, then subjected to freeze-drying for 60 hours to obtain a modified nano-graphite inducer.

The modified nano-graphite inducer had an average lamella size of 362 nm and an average lamella thickness of 3.9 nm, and exhibited a structure shown in formula (II), wherein n=40, and R was $CH_3$; the grafting ratio of the monofunctional polyether amine was 33 wt %, based on the total weight of the modified nano-graphite particles.

Example 3

(1) 0.5 g of nano-graphite oxide with an average lamella size of 302 nm and an average lamella thickness of 2.6 nm was ultrasonically dispersed in 100 mL of deionized water at the temperature condition of 25° C. for 25 min to obtain a uniform nano-graphite oxide dispersion liquid;
(2) Nitrogen gas was continuously introduced into the nano-graphite oxide dispersion liquid obtained in step (1) at the temperature condition of 25° C., 0.5 g of 1-ethyl-(3-dimethyl aminopropyl) carbodiimide hydrochloride was added, and stirred for 15 min, 0.5 g of N-hydroxysuccinimide was further added, and stirred for 15 min to obtain an active nano-graphite oxide dispersion liquid;
(3) 1.5 g of monofunctional polyether amine (with a number average molecular weight of 3,000 g/mol) was added into the active nano-graphite oxide dispersion liquid in step (2), the temperature was raised to 58° C., the condensation backflow reaction was performed in nitrogen gas for 42 hours to obtain a mixed reaction liquid;
(4) The mixed reaction solution obtained in step (3) was filtered by using a polytetrafluoroethylene membrane having a pore diameter of 0.22 μm, the filtered product was then washed with absolute ethyl alcohol for 4 times, then subjected to freeze-drying for 72 hours to obtain a modified nano-graphite inducer.

The modified nano-graphite inducer had an average lamella size of 471 nm and an average lamella thickness of 5.9 nm, and exhibited a structure shown in formula (II), wherein n=60, and R was H; the grafting ratio of the monofunctional polyether amine was 29 wt %, based on the total weight of the modified nano-graphite particles.

Example 4

(1) 10 g of a chelating agent (disodium ethylene diamine tetraacetate) was slowly added into 1,000 mL of water while stirring under the temperature condition of 25° C., then continuously stirred for 10-20 min until all the chelating agent was dissolved into a clear and transparent solution;
(2) 0.5 g of modified nano-graphite indicator prepared in Example 1 was added into the solution obtained in step (1) while stirring under the temperature condition of 25° C., continuously stirred for 10-20 min, then subjected to the ultrasonic for 10-20 min to obtain a uniform dispersion solution;
(3) 4 g of temperature-resistant and salt-resistant functional polymer (wherein the mass ratio of the acrylamide structural unit to the 2-acrylamido-2-methyl propane sulfonic acid structural unit was 6:4; the relative molecular mass was $4.2 \times 10^6$ g/mol; and the hydrolysis degree was 2.5%) was added into the dispersion solution obtained in step (2) while stirring, then continuously stirred for 1.5-2 hours to obtain a uniform dispersion solution;
(4) 6 g of a cross-linking agent (the mixture of hexamethylenetetramine and hydroquinone with a mass ratio of 1:1) was added into the dispersion solution obtained in step (3) while stirring under the temperature condition of 25° C., and continuously stirred for 20-30 min to obtain a gel-forming solution;
(5) The gel-forming solution obtained in step (4) was subjected to standing still in a drying oven at 100° C. for 8 hours, and waited for the gelling process to obtain a temperature-resistant and salt-resistant modified nano-graphite bulk gel;
(6) The temperature-resistant and salt-resistant modified nano-graphite bulk gel obtained in step (5) and water were placed in a colloid mill according to the mass ratio of 1:1 and sheared for 8 min to obtain a temperature-resistant and salt-resistant modified nano-graphite DPG with a strong self-growing effect.

The temperature-resistant and salt-resistant modified nano-graphite DPG A1 with a strong self-growing effect was prepared in the Example, and the DPG particles had an average initial particle size of 371 nm.

Figure 2:
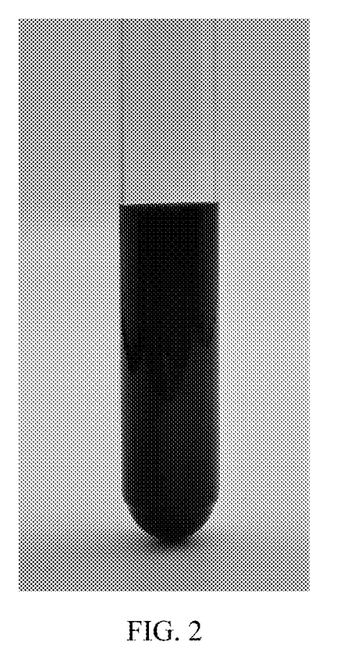
FIG. 2 shows the initial dispersion macroscopic state of the temperature-resistant and salt-resistant modified nano-graphite DPG with a strong self-growth effect prepared in Example 4 of the present disclosure.

The initial macroscopic state of the DPG was shown in FIG. 2, which illustrated that the DPG had excellent dispersibility in water.

Figure 3:
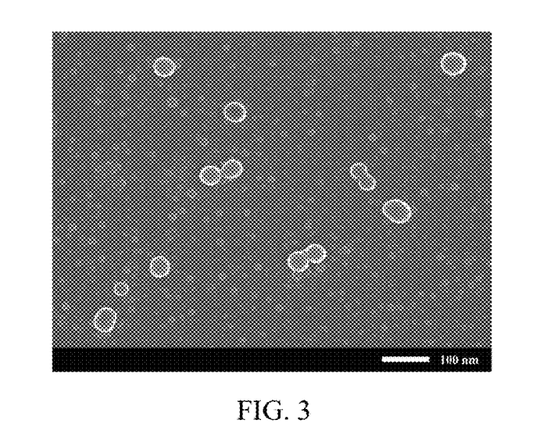
FIG. 3 shows the initial dispersion microscopic state of the temperature-resistant and salt-resistant modified nano-graphite DPG with a strong self-growth effect prepared in Example 4 of the present disclosure.

The initial microscopic state of the DPG was shown in FIG. 3, which illustrated that the initial microscopic morphology of the DPG particles was well-dispersed spherical particles.

Figure 4:
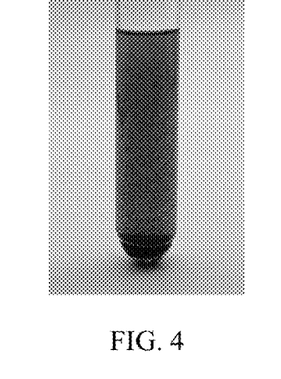
FIG. 4 illustrates the macroscopic state of the temperature-resistant and salt-resistant modified nano-graphite DPG prepared in Example 4 of the present disclosure after aging.

The macroscopic state of the DPG after aging was shown in FIG. 4, which illustrated that the DPG had a strong self-growth characteristic in the high-temperature and high-salinity environment.

Figure 5:
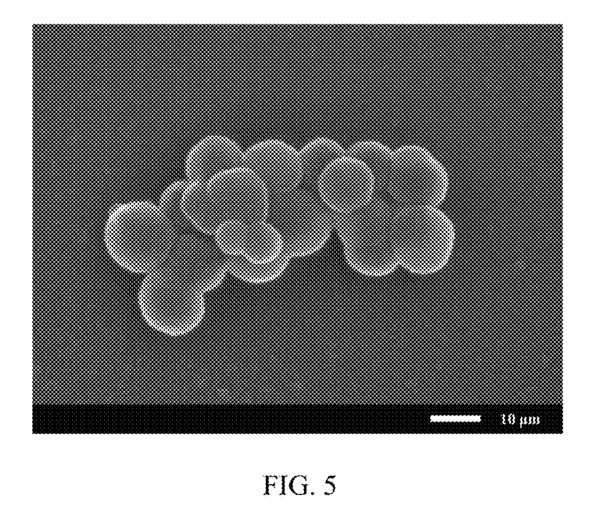
FIG. 5 illustrates the microscopic state of the temperature-resistant and salt-resistant modified nano-graphite DPG prepared in Example 4 of the present disclosure after aging.

The microscopic state of the DPG after aging was shown in FIG. 5, which illustrated that the DPG generated self-growth behavior after aging in the high-temperature and high-salinity environment, an agglomerate with a strong adhesion effect was formed.

Example 5

(1) 15 g of a chelating agent (tetrasodium ethylene diamine tetraacetate) was slowly added into 1,000 mL of water while stirring under the temperature condition of 25° C., then continuously stirred for 10-20 min until all the chelating agent was dissolved into a clear and transparent solution;
(2) 1 g of modified nano-graphite indicator prepared in Example 2 was added into the solution obtained in step (1) while stirring under the temperature condition of 25° C., continuously stirred for 10-20 min, then subjected to the ultrasonic for 10-20 min to obtain a uniform dispersion solution;
(3) 6 g of temperature-resistant and salt-resistant functional polymer (wherein the mass ratio of the acrylamide structural unit to the 2-acrylamido-2-methyl propane sulfonic acid structural unit was 5:5; the relative molecular mass was $5.0 \times 10^6$ g/mol, and the hydrolysis degree was 3.6%) was added into the dispersion solution obtained in step (2) while stirring, then continuously stirred for 1.5-2 hours to obtain a uniform dispersion solution;
(4) 8 g of a cross-linking agent (the mixture of hexamethylenetetramine and resorcinol with a mass ratio of 1.5:1) was added into the dispersion solution obtained in step (3) while stirring under the temperature condition of 25° C., and continuously stirred for 20-30 min to obtain a gel-forming solution;
(5) The gel-forming solution obtained in step (4) was subjected to standing still in a drying oven at 95° C. for 15 hours, and waited for the gelling process to obtain a temperature-resistant and salt-resistant modified nano-graphite bulk gel;
(6) The temperature-resistant and salt-resistant modified nano-graphite bulk gel obtained in step (5) and water were placed in a colloid mill according to the mass ratio of 5:1 and sheared for 15 min to obtain a temperature-resistant and salt-resistant modified nano-graphite DPG with a strong self-growing effect.

The temperature-resistant and salt-resistant modified nano-graphite DPG A2 with a strong self-growing effect was prepared in the Example, and the DPG particles had an average initial particle size of 495 nm.

Example 6

(1) 20 g of a chelating agent (disodium ethylene diamine tetraacetate) was slowly added into 1,000 mL of water while stirring under the temperature condition of 25° C., then continuously stirred for 10-20 min until all the chelating agent was dissolved into a clear and transparent solution;
(2) 1.5 g of modified nano-graphite indicator prepared in Example 3 was added into the solution obtained in step (1) while stirring under the temperature condition of 25° C., continuously stirred for 10-20 min, then subjected to the ultrasonic for 10-20 min to obtain a uniform dispersion solution;
(3) 8 g of temperature-resistant and salt-resistant functional polymer (wherein the mass ratio of the acrylamide structural unit to the 2-acrylamido-2-methyl propane sulfonic acid structural unit was 4:6; the relative molecular mass was $6.5 \times 10^6$ g/mol, and the hydrolysis degree was 5.5%) was added into the dispersion solution obtained in step (2) while stirring, then continuously stirred for 1.5-2 hours to obtain a uniform dispersion solution;
(4) 10 g of a cross-linking agent (the mixture of formaldehyde and catechol with a mass ratio of 2:1) was added into the dispersion solution obtained in step (3) while stirring under the temperature condition of 25° C., and continuously stirred for 20-30 min to obtain a gel-forming solution;
(5) The gel-forming solution obtained in step (4) was subjected to standing still in a drying oven at 90° C. for 20 hours, and waited for the gelling process to obtain a temperature-resistant and salt-resistant modified nano-graphite bulk gel;
(6) The temperature-resistant and salt-resistant modified nano-graphite bulk gel obtained in step (5) and water were placed in a colloid mill according to the mass ratio of 7:1 and sheared for 12 min to obtain a temperature-resistant and salt-resistant modified nano-graphite DPG with a strong self-growing effect.

The temperature-resistant and salt-resistant modified nano-graphite DPG A3 with a strong self-growing effect was prepared in the Example, and the DPG particles had an average initial particle size of 586 nm.

Example 7

(1) 25 g of a chelating agent (tetrasodium ethylene diamine tetraacetate) was slowly added into 1,000 mL of water while stirring under the temperature condition of 25° C., then continuously stirred for 10-20 min until all the chelating agent was dissolved into a clear and transparent solution;
(2) 2.0 g of modified nano-graphite indicator prepared in Example 3 was added into the solution obtained in step (1) while stirring under the temperature condition of 25° C., continuously stirred for 10-20 min, then subjected to the ultrasonic for 10-20 min to obtain a uniform dispersion solution;
(3) 10 g of temperature-resistant and salt-resistant functional polymer (wherein the mass ratio of the acrylamide structural unit to the 2-acrylamido-2-methyl propane sulfonic acid structural unit was 5:5; the relative molecular mass was $5.0 \times 10^6$ g/mol, and the hydrolysis degree was 3.6%) was added into the dispersion solution obtained in step (2) while stirring, then continuously stirred for 1.5-2 hours to obtain a uniform dispersion solution;
(4) 12 g of a cross-linking agent (the mixture of formaldehyde and hydroquinone with a mass ratio of 1:1) was added into the dispersion solution obtained in step (3) while stirring under the temperature condition of 25° C., and continuously stirred for 20-30 min to obtain a gel-forming solution;
(5) The gel-forming solution obtained in step (4) was subjected to standing still in a drying oven at 90° C. for 24 hours, and waited for the gelling process to obtain a temperature-resistant and salt-resistant modified nano-graphite bulk gel;
(6) The temperature-resistant and salt-resistant modified nano-graphite bulk gel obtained in step (5) and water were placed in a colloid mill according to the mass ratio of 9:1 and sheared for 10 min to obtain a temperature-resistant and salt-resistant modified nano-graphite DPG with a strong self-growing effect.

The temperature-resistant and salt-resistant modified nano-graphite DPG A4 with a strong self-growing effect was prepared in the Example, and the DPG particles had an average initial particle size of 702 nm.

Comparative Example 1

The DPG was prepared according to the same method as that in Example 4, except that the modified nano-graphite inducer was not adopted, a DPG B1 was prepared, and the DPG B1 particles had an average initial particle size of 355 nm.

Comparative Example 2

The DPG was prepared according to the same method as that in Example 5, except that the modified nano-graphite inducer was not adopted, a DPG B2 was prepared, and the DPG B2 particles had an average initial particle size of 481 nm.

Comparative Example 3

The DPG was prepared according to the same method as that in Example 6, except that the modified nano-graphite inducer was not adopted, a DPG B3 was prepared, and the DPG B3 particles had an average initial particle size of 562 nm.

Comparative Example 4

The DPG was prepared according to the same method as that in Example 7, except that the modified nano-graphite inducer was not adopted, a DPG B4 was prepared, and the DPG B4 particles had an average initial particle size of 689 nm.

Comparative Example 5

The DPG was prepared according to the same method as that in Example 4, except that a nano-graphite oxide (having an average lamella size of 183 nm and an average lamella thickness of 1.7 nm) was used for replacing the modified nano-graphite inducer. A DPG B5 was prepared, and the DPG B5 particles had an average initial particle size of 361 nm.

The temperature-resistant and salt-resistant modified nano-graphite DPGs with a strong self-growing effect prepared in Examples 4-7 and the DPGs prepared in Comparative Examples 1-5 were respectively placed under the conditions of different temperatures and mineralization degrees, the self-growing ability of the DPGs after aging for 30 days was measured, and the change in particle size was as shown in Table 1.

TABLE 1

| DPG | Initial particle size (nm) | Temperature: 140° C., mineralization degree: $20 \times 10^4$ mg/L ($18.0 \times 10^4$ mg/L NaCl, $1.0 \times 10^4$ mg/L CaCl$_2$, $1.0 \times 10^4$ mg/L MgCl$_2$) | | Temperature: 160° C., mineralization degree: $25 \times 10^4$ mg/L ($22.8 \times 10^4$ mg/L NaCl, $1.1 \times 10^4$ mg/L CaCl$_2$, $1.1 \times 10^4$ mg/L MgCl$_2$) | | Temperature: 180° C., mineralization degree: $30 \times 10^4$ mg/L ($27.6 \times 10^4$ mg/L NaCl, $1.2 \times 10^4$ mg/L CaCl$_2$, $1.2 \times 10^4$ mg/L MgCl$_2$) | |
|---|---|---|---|---|---|---|---|
| | | Particle size after aging (μm) | Self-growth multiple (times) | Particle size after aging (μm) | Self-growth multiple (times) | Particle size after aging (μm) | Self-growth multiple (times) |
| A1 | 371 | 70.06 | 188.84 | 75.21 | 202.72 | 77.43 | 208.71 |
| A2 | 495 | 73.49 | 148.46 | 78.85 | 159.29 | 84.11 | 169.92 |
| A3 | 586 | 76.82 | 131.09 | 80.16 | 136.79 | 86.43 | 147.49 |
| A4 | 702 | 80.19 | 114.23 | 84.27 | 120.04 | 88.53 | 126.11 |
| B1 | 355 | 14.26 | 40.17 | 13.59 | 38.28 | 9.993 | 28.15 |
| B2 | 481 | 18.56 | 38.59 | 16.89 | 35.11 | 11.09 | 23.06 |
| B3 | 562 | 21.41 | 38.10 | 19.57 | 34.82 | 12.76 | 22.70 |
| B4 | 689 | 23.52 | 34.14 | 21.39 | 31.04 | 14.02 | 20.35 |
| B5 | 361 | 19.56 | 54.18 | 18.49 | 51.22 | 16.87 | 46.73 |

According to the results shown in Table 1, the DPGs prepared in Examples 4-7 have obvious self-growth behavior under the high-temperature and high-salinity conditions, the particle size after aging tends to increase along with an increase of the temperature and the mineralization degree, and the maximum self-growth multiple can reach 200 times or more, and the DPGs exhibit excellent temperature resistance and salt resistance. In contrast, the DPGs prepared in Comparative Examples 1-5 have a low self-growth rate under the high-temperature and high-salinity conditions, and the self-growth multiple of the DPGs tends to decrease along with an increase in the temperature and the mineralization degree, which indicates that the structure of the DPG particles is damaged to a certain extent, and the temperature resistance and salt resistance are poor. To sum up, the addition of the modified nano-graphite inducer provided by the present disclosure can enhance the self-growth capability of the DPGs and the strength of a self-grown agglomerate, and ensure that the temperature-resistant and salt-resistant modified nano-graphite DPG system with a strong self-growth effect can meet the requirement of regulating and controlling the heterogeneity of the ultrahigh-temperature and ultrahigh-salinity oil reservoirs.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A temperature-resistant and salt-resistant modified nano-graphite dispersed particle gel system with a strong self-growth effect comprising a temperature-resistant and salt-resistant functional polymer, a cross-linking agent, a chelating agent, and a modified nano-graphite inducer; the modified nano-graphite inducer comprises nano-graphite oxide particles and monofunctional polyether amine covalently grafted on the surfaces of the nano-graphite oxide particles through amido bonds, and the structural formula of the monofunctional polyether amine is as shown in formula (I):

(I)

wherein $R_1$ is one selected from $C_1$-$C_5$ alkyl groups; $R_2$ is H or one of $C_1$-$C_5$ alkyl groups; and n is an integer from 10 to 60.

2. The dispersed particle gel system of claim 1, wherein the monofunctional polyether amine has a grafting ratio within the range of 15-40 wt %, based on the total weight of the modified nano-graphite inducer.

3. The dispersed particle gel system of claim 1, wherein the modified nano-graphite inducer has an average lamella size within the range of 150-600 nm; and the modified nano-graphite inducer has an average lamella thickness within the range of 1-100 nm.

4. The dispersed particle gel system of claim 3, wherein the modified nano-graphite inducer has an average lamella size within the range of 200-500 nm; and the modified nano-graphite inducer has an average lamella thickness within the range of 1-20 nm.

5. The dispersed particle gel system of claim 1, wherein in the modified nano-graphite inducer, $R_1$ is $CH_3$; $R_2$ is H and/or $CH_3$; and n is 12, 20, 40 or 60.

6. The dispersed particle gel system of claim 1, wherein the modified nano-graphite inducer has at least one of the structures shown in formulas (II), (III), (IV), and (V);

(II)

(III)

(IV)

(V)

wherein in formulas (II), (III), (IV), and (V), R is each independently H and/or CH₃; and n is each independently 12, 20, 40, or 60.

7. The dispersed particle gel system of claim 1, wherein the content of the cross-linking agent is 60-300 parts by weight, the content of the chelating agent is 100-750 parts by weight, and the content of the modified nano-graphite inducer is 2-20 parts by weight; based on 100 parts by weight of the temperature-resistant and salt-resistant functional polymer, the temperature-resistant and salt-resistant functional polymer is selected from a binary copolymer of acrylamide and 2-acrylamide-2-methyl propane sulfonic acid;

the cross-linking agent is an aldehyde cross-linking agent and/or a phenolic cross-linking agent;

the chelating agent is disodium ethylene diamine tetraacetate and/or tetrasodium ethylene diamine tetraacetate; and the water is clear water or treated oil field reinjection sewage.

8. The dispersed particle gel system of claim 7, wherein the mass ratio of the acrylamide structural unit to the 2-acrylamide-2-methyl propane sulfonic acid structural unit is (4-6):(6-4); the aldehyde cross-linking agent is hexamethylenetetramine and/or formaldehyde; and the phenolic cross-linking agent is at least one of catechol, resorcinol, and hydroquinone.

9. The dispersed particle gel system of claim 7, wherein the binary copolymer has a relative molecular mass within the range of $4.0 \times 10^6$ g/mol-$8.0 \times 10^6$ g/mol; the binary copolymer has a hydrolysis degree within the range of 2-6%: the cross-linking agent is a combination of an aldehyde cross-linking agent and a phenolic cross-linking agent, and the mass ratio of the aldehyde cross-linking agent to the phenolic cross-linking agent is (0.5-2): 1.

* * * * *